March 25, 1930.    F. D. GOODY    1,752,169
CONCENTRATOR
Filed June 22, 1926    3 Sheets-Sheet 1
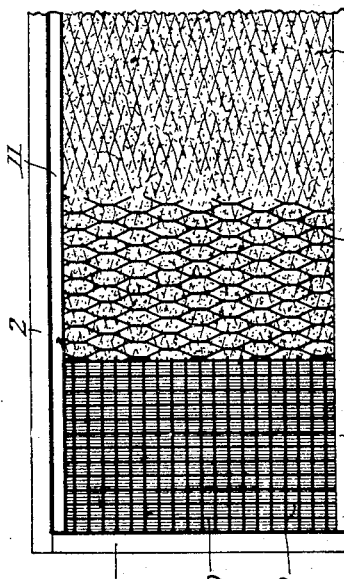
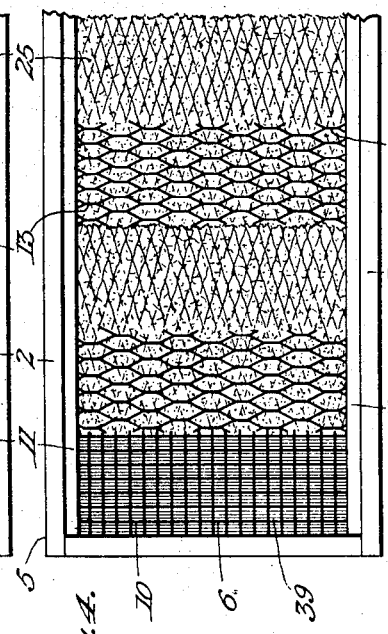
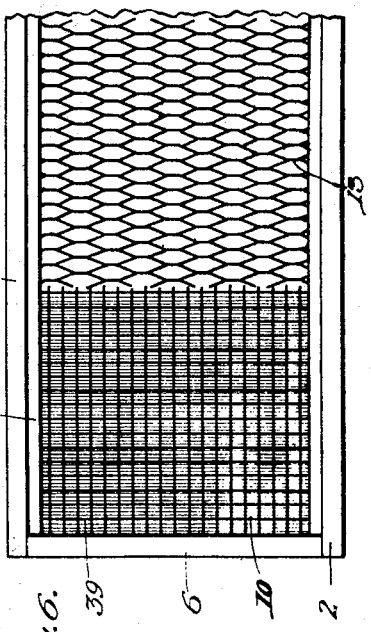
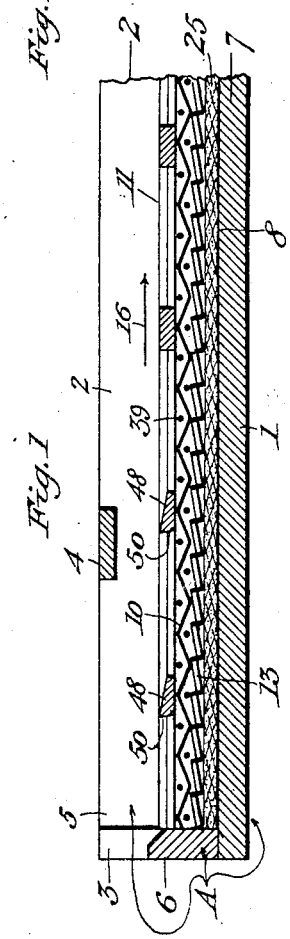
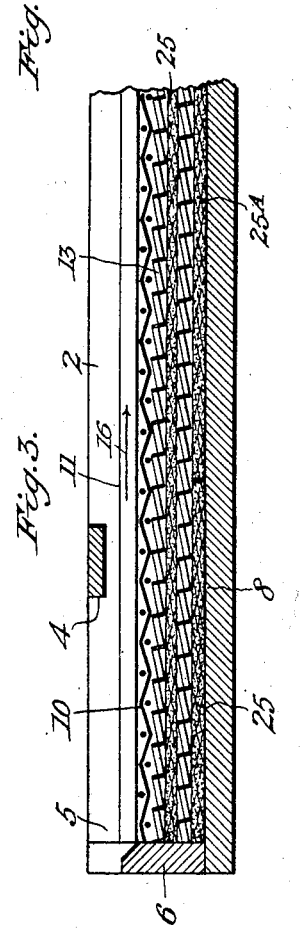
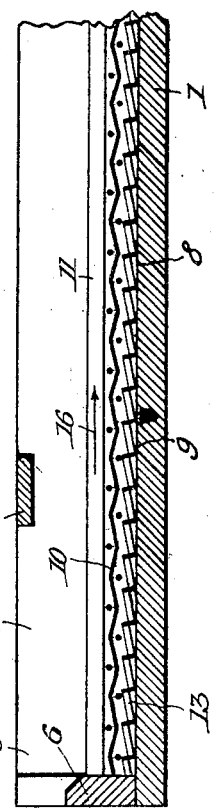
Inventor
Forest D. Goody
By H. S. Bailey, Attorney

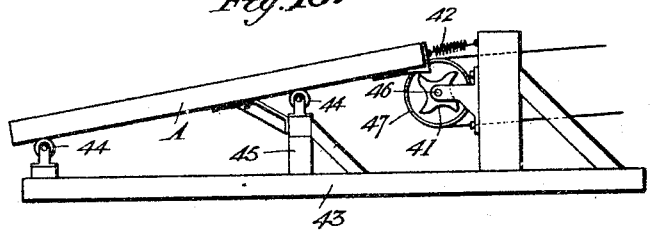
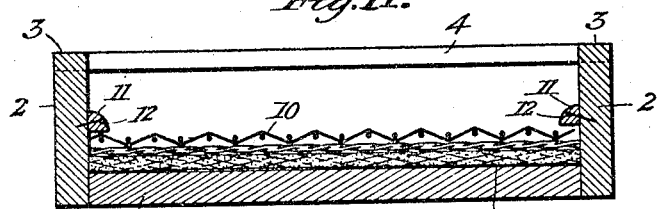
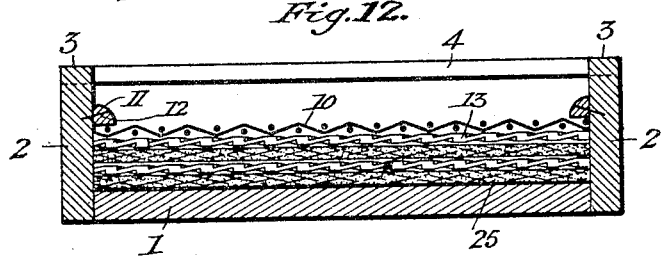
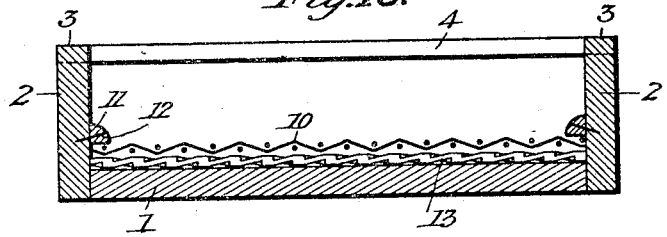
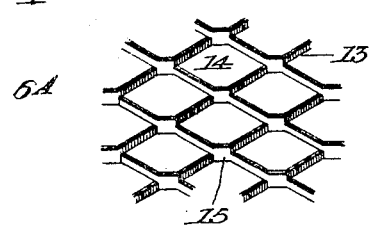

March 25, 1930.  F. D. GOODY  1,752,169
CONCENTRATOR
Filed June 22, 1926   3 Sheets-Sheet 3
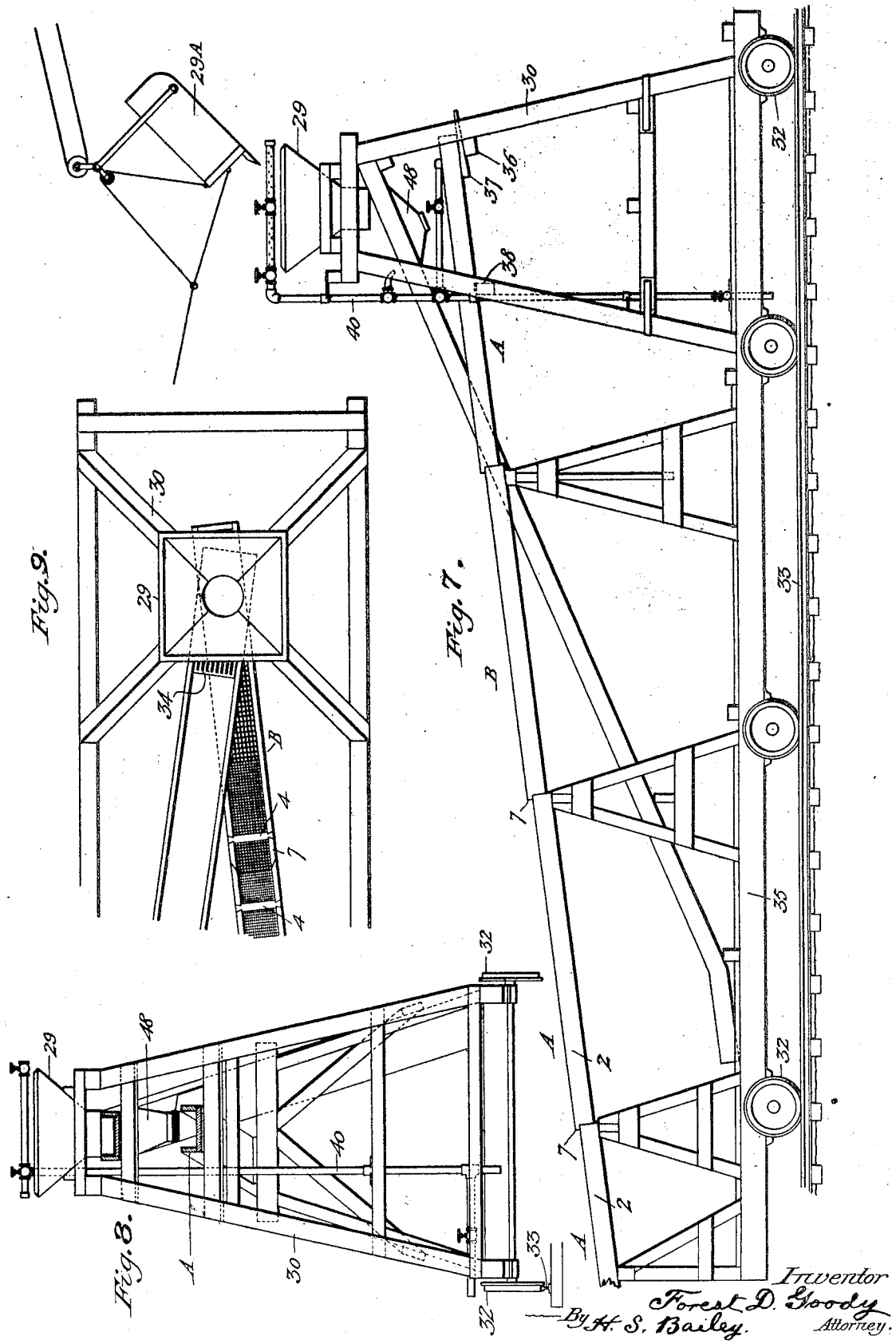
Inventor
Forest D. Goody
By H. S. Bailey.  Attorney.

Patented Mar. 25, 1930

1,752,169

UNITED STATES PATENT OFFICE

FOREST D. GOODY, OF DENVER, COLORADO

CONCENTRATOR

Application filed June 22, 1926. Serial No. 117,836.

My invention relates to a concentrator for catching and concentrating platinum, gold, silver and other metals that occur in a free or native state or that are connected to or associated with other metals in placer ground in rivers, creeks and gulches or are wholly or partially separated from their non-valuable vein matter by the recovery treatment they receive in ore reduction and metal extracting mills.

And the objects of my invention are:

First: To provide an apparatus for the recovery of platinum, gold, silver and such other metals as are found in the beds of rivers, creeks and gulches as well as to catch and save free particles of minerals from the ore tailing mills that are flowing to waste.

Second: To provide a placer gold and other placer metal catching and holding apparatus for use in placer mining operations, that is arranged to allow placer sands and gravels and water to flow in a stream through it, and in which the finest particles of gold as well as the coarsest are guided into and are held in a multiplicity of pocket-like spaces, that are formed by metal members that contain open spaces or pocket members by themselves or in combination with matting materials, that are so arranged that an under current of water cannot be formed below them that would carry off the very fine and the flour size and the floating gold between them and the bottom of their supporting box.

Third: To provide a placer gold saving apparatus that is made in sections of several feet in length, and that is inexpensive to make and that will receive the screened products from a grizzly screen or from revolving screens and that can be used for the recovery of free gold or any other free metals from any kind of placer deposits or from granulated mill products.

I attain these objects by the mechanism illustrated in the accompanying drawings in which:—

Fig. 1 is a longitudinal sectional view of a fragment of my apparatus for catching, holding and concentrating gold, platinum, silver and other metals from placer ground and ore-mill products, and I illustrate one arrangement for recovering these metals for commercial uses, which consists of a strip of coarsely woven twisted rope matting on the floor of the sluice box, and of a diamond shaped mesh ribbon form of metal screen.

Fig. 2 is a plan view of Fig. 1.

Fig. 3 is a sectional view similar to Fig. 1, but showing a different combination of gold and other metal catching and concentrating members.

Fig. 4 is a plan view of Fig. 3.

Figs. 5 and 6 are plan views showing different combinations of gold and other metal catching and concentrating elements than either Figures 1 and 2.

Fig. 6A is a perspective fragmentary view of a small piece of the diamond shaped mesh metal screen shown in Figures 1, 2, 3, 4, 5 and 6.

Fig. 7 illustrates a gold and other metal catching and concentrating flume and its supporting tower and the wheeled frame and track that permit it to be moved along one of the banks of a placer bearing stream or along side of placer bearing gulches and deposits.

Fig. 8 illustrates an end elevation of the tower, facing the gravel, sand and water receiving end of the flume.

Fig. 9 is a partial plan view of the tower and the hopper, and shows a part of the grizzly and a short section of the upper end of the flume and shows different sizes of screens in the flume.

Fig. 10 is a side elevation of a sluice box and one form of associated mechanism for vibrating the same.

Fig. 11 is a cross sectional view of Fig. 1.

Fig. 12 is a cross sectional view of Figure 3.

Fig. 13 is a cross sectional view of Fig. 5.

Similar letters of reference refer to similar parts throughout the several views.

My gold saving apparatus also acts to concentrate the valuable particles of gold and other metals into the above named spaces or pocket-like members of the combination of screens alone, or the combination of screens combined with matting material which also catches and holds them; and consequently it is also a concentrator of them after they are stopped and are caught and held in it as the sand, gravel and water flow through it.

I mention the partially free metals, as placer gold is sometimes coated with iron rust, or attached to or connected to or associated with iron or silver, bismuth and other metals. The granulated products of ore treating mills also contain particles of gold and other valuable metals, such as, small pieces or particles of Sylvanite, or gold telluride; petzite or gold and silver telluride; calaverite, or gold tellurium; hessite, or silver tellurium ores, that are joined to, or are chemically bound up in particles of non-metallic elements or with metalloids or with gangue rock, and yet they are heavy enough to be caught and concentrated and saved in my gold and other precious metal catching, holding, concentrating and saving apparatus, some of the features of which are present in Patent No. 1,588,102 issued to me June 8, 1926.

Referring to the drawings: The views shown in Figures 1, 3 and 5, show longitudinal sections of short portions of the water, gravel and sand receiving end of the square-shaped long narrow box members, shown in plan view in Figures 2, 4 and 6. I can make these long boxes of either metal or wood, or of any other suitable material. I preferably, however, make them of wood, and simply nail the sides to the bottom part 1. These long boxes are preferably made in lengths of about sixteen feet long, in order to be easily and quickly handled by a workman, but each length of these long boxes is made a complete gold saving and concentrating device in itself, that is, it is a complete gold and other metal saving unit. My combined gold saving and concentrating apparatus is used in an overlapping end to end alignment as shown in Fig. 7.

My gold saving and concentrating apparatuses are positioned, when in placer ground treating positions, at a downward angle, as shown in Fig. 7, and the angle at which they are set is adjusted to fit the flowing speed of the gravel and sand over its valuable metal stopping surfaces with which they come in contact as they settle by gravity, due to their much greater specific gravity over the sand and gravel or the gangue matter of granulated mill products. They are consequently set at such a downward inclined angle as will allow the gravel and sand and water to flow freely, and only fast enough to allow the gravel and sand to move intimately in contact with the gold and other metals stopping and catching elements within the number of boxes the unit is composed of. The water forms a separating and a carrying and a settling and a propelling medium for flowing the fine gravel and sand through the long boxes; but if desired, placer ground can be run through my gold saving apparatus without using water; but when that is done, the ground should be prefectly dry, and better results could be obtained if the apparatus was given a vibratory motion as shown in Fig. 10. Consequently while my combined gold saving and concentrating apparatus will treat perfectly dry gravel, its largest use is, however, for wet placer mining, which means, using plenty of water to easily flow the gravel and sand through the sluice box or boxes, and also for recovering the free gold and partially free metals from the granulated products of ore treating mills, using water enough to flow them freely through the sluice box or boxes.

The gold, silver and platinum and other valuable metal saving elements, such as I place in my combined gold and concentrating apparatus are as follows, and they are placed in a box in the following different arrangements of the two or more different materials that I use therein.

The long boxes I employ to catch and hold the gold and other metals are commonly called by placer miners, sluice boxes; the inside floor member 8, of the box is made straight, and flat across the width of the box, and is preferably made smooth throughout the length of the box.

Then I place down into and against the floor 8, of each sluice box and along its entire length and also across the width of the box, a strip of perforated metal 9, arranging and fitting it, so as to fully cover the floor 8, but loose enough therein to be removed when desired. This metal member is perforated or made into a screening or a lattice type of construction, that may be made to contain any kind of character or form of gold or other metal entering meshes, such as, diamond, oblong, or any other desired shape of meshes. Then on top of this lower screen member, I place preferably an ordinary right angles-wire screen 10, which may be of any desired mesh; but at the upper end 5 of the box where the gravel, sand and water enter, the screen is preferably made of a coarse mesh, of about one-half inch to an inch mesh, depending on the character of the placer ground and the size of the gold and other metals in it; then wire screens of smaller mesh may be added below this upper coarse mesh screen at one or two different parts of the length of the box, or a screen of any desired coarse mesh may be placed in the box and a smaller screen in the box below and a still smaller screen in the third box and so on throughout the remaining boxes, if more are used, such as when four or more boxes are used in end to end alignment, these different sizes of mesh of screen are shown in the plan view of Fig. 9.

These two metal screens are firmly held against the floor of the box by removable side strips 11, which may be made of any desired material, preferably of wood, and they are removably secured against the top of the upper screen, to and against the insides of the opposite sides of the box by any suitable means, preferably by nails 12, which can be easily removed when it is necessary to remove the screens from the box to remove from their interstices or pockets that are formed in them, the gold between the floor of the box and the top of the lower screen where the gold and other valuable metals have been caught and held and concentrated within their meshes, as will be presently described.

This arrangement of two screening members shown in Figures 5 and 6 containing any suitable kinds or character of interstices or spaces with either flat, turned up or expanded metal sides of the interstices or spaces of the lower screen for catching gold and other valuable metals, comprises the simplest form of my present invention, and it is very highly effective in catching the coarse gold from placer ground and mill products; but where very fine or flour or float gold is encountered in placer ground or mill products, I add to the box, a matting material, preferably using a twisted rope strand form of burlap matting 25 or Brussels carpet 25A or both, see Fig. 3.

In Fig. 1, I illustrate a screen of one of my sluice boxes in which a layer of twisted rope strand form of burlap matting of any desired mesh, preferably of open mesh, is placed in the box, down against its flat smooth floor portion and extending through the entire length and across its entire width and on top of that I illustrate, a metal screen of this ribbon metal screen containing wide meshes and I preferably illustrate, an expanded metal form of screen 13, in which the interstices or meshes 14, are of diamond shape, and are illustrated in Figure 6A and the thin flat sides 15, between them are arranged to stand upward on edge.

This screen is positioned in the box so that the vertical sides 15, of the expanded portions incline toward the downward and onward flowing gold and other metals, and they enter under flat sides of these diamond shape interstices and on account of their angular position, the gold and other valuable metals are guided against the burlap matting; or in case the burlap matting is left out, the gold and the screen lay flat in the box; then the gold and other metals would be guided by the angular arranged sides of the diamond shaped meshes of the screen, down against the floor of the sluice box, where they would be concentrated and held against being carried away out of the box. Consequently they are saved and recovered from the downwardly flowing gravel and sand of the placer ground which moves in the direction of the arrows 16, underneath the upper thin flat sides 15 of these diamond shaped interstices or meshes of this expanded type of thin flat metal screen 13.

I have called particular attention to this diamond shaped mesh form of expanded metal screen material as its angular surfaces facing the onward and downward flowing gold and other metals, act to guide them to the floor of the box or to the top of the burlap matting and down into the spaces and pockets in this twisted rope strand form of burlap matting, which contains numerous small pocket-like spaces, particularly adapted to catch and hold the gold no matter how fine it may be, that works down into it. There are, however, some characters of very fine flake gold that are so easily moved by the flowing water, sand and gravel, that it is necessary to guide them downward and into the pockets, where they will concentrate away from the action of the flowing water and fine sand, some of which is of a very fine nature, and the hexagonal shaped expanded metal screens in Figures 1, 2, 3, 4, 5, 6 and 6A.

In Fig. 3, a strip of twisted rope matting 25 and a strip of Brussels carpet 25A are placed on the floor of the sluice box and a diamond mesh screen 13 is placed on top of them; a strip of twisted rope matting 25 is then placed on top of the diamond mesh screen; then another strip of diamond mesh screen is placed on top of the upper layer of twisted rope matting 25, and then the cross wire riffle screen is placed on top of the upper diamond mesh screen thus making a valuable combination for gold that is fine enough to float on top of water and for gold that is so fine that it cannot be seen without a magnifying glass as this very finest of gold will work down deep into the catching and concentrating materials and be saved as the onwardly flowing current of water easily moves it onward, but it will work down into and through the open screens and through the upper strip of coarsely woven rope strand form of burlap and be caught and held in the lower strip of matting on the floor of the sluice box, and they will then be out of the current of the water and fine sand as they flow through the sluice box or boxes, but where all gold found in placers, ranges from flour to coarse gold and small nuggets, the combination shown in Fig. 1 is less expensive to keep up, and the gold is extracted from it with less work.

The arrangement shown in Fig. 5 is better adapted and easier handled for coarse placer gold, than the finest of flour gold or very fine flake gold.

When placer mining on a large scale, with several sluice boxes arranged to form a flume, a supporting frame has to be provided for it, and a tower, a hopper, a screen and a gravel and sand excavating and shoveling dredging machine to raise the placer ground and discharge it in the hopper on the tower as shown in Fig. 7 and screen it of its gravel, that is too large to run through the sluice boxes of the flume, and also a supply of water has to be provided to wash and flow the screened size of gravel and sand through the sluice boxes. The tower and the frame have to support the flume high enough above the ground to provide a dumping space at the end of it for the gravel and sand, and I preferably place the hopper 29 on the top of the tower 30, and the screen 31 is placed below the hopper and I preferably use for shoveling up the placer ground, a drag line bucket dredge, the bucket 29A of which will discharge its contents into the hopper 29 of the tower, as shown in Fig. 7.

My invention, however, contemplates the use of any placer gravel and sand shoveling and raising dredge or conveyor. I do not illustrate, however, a sand and gravel shoveling and raising and discharging dredge or conveying apparatus, or a pumping plant, as they do not form a part of my present combined saving and concentrating apparatus.

When treating dry ground and also certain characters of mill products, such as thick ore pulp or slimes a larger percentage of their values would probably be obtained if the sluice box could be agitated or vibrated or reciprocated or given a bumping action. I have never found it necessary, however, to use a vibrating or bumping action on my sluice boxes in all of the work I have done with them in the several years of constant use of them, but to get the best results from any mineral bearing product, that requires that a settling action be given to one or more sluice boxes I illustrate a simple mechanism for vibrating them, which I illustrate in Fig. 9 connected to the upper sluice box and it will give a combined bumping and reciprocating action to the sluice box that will settle the fine particles of gold and other valuable metals that would flow through my sluice box.

The tower 30, that supports the upper sluice box, preferably consists of a simple wooden construction and is illustrated, mounted on wheels 32, to enable it to be moved from one position to another along the placer ground on tracks 33.

It is also necessary that a screening device be used for screening away the rocks and gravel that are too large to flow through the sluice box, and I preferably use for this purpose, a screen called a grizzly 34, which consists of iron bars, spaced a short distance apart, preferably from about one-half to an inch apart; the placer products that pass through the spaces between the bars, fall into the upper end of my upper sluice box, while the placer rocks and gravel that are too large to pass through the spaces in the grizzly slide off and are discharged away from the tower, as the grizzly is made long enough to extend close enough to the discharge end of the gold flume or line of boxes to allow all sand and gravel to discharge to one dumping ground at the rear end of the tower and of the timber frame 35, that supports the gold flume B, which I prefer to call a complete line of sluice boxes A, which is arranged to extend at an angle along one side of the timber frame, while the over size gravel flume is extended from the tower at an angle to the other side of the timber frame as shown in the plan view Fig. 9.

The upper end 5 of my gold saving box is adjustably supported on a cross beam 36, cleats 37, that are inserted under it, and its lower end is also supported on a cross beam 38, consequently, the upper end can be raised or lowered to give that degree of inclination best suited to allow the placer gravel and sand to flow through it at a speed that will allow the cross wires 39 of the screen 10 which form cross riffles that tend to stop, retard and hesitate the gold and other mineral particles long enough to cause them to settle out of the sand and gravel, down between the meshes of the screen and into the gold and other metal catching screens and the matting or fibrous material or other materials in the sluice boxes.

A water supplying pipe 40, is also shown, arranged to discharge water into the hopper and into the upper end of the upper sluice box A of the flume B.

I illustrate four of my long gold saving and concentrating sluice boxes, secured in stationary non-vibrating positions, and while my gold saving device is normally a stationary non-vibrating device, there are some characters of placer and mill dirt and tailings and especially dry placer ground where better results would be attained if it were vibrated. And while my invention contemplates any kind of a vibrating mechanism connected to my gold saving box, I preferably use a cam 41 and a spring mechanism 42, which are shown mounted on a supporting frame 43, which is provided with rollers 44 on which my gold saving box is mounted, and a bumper block 45 which is placed in position for the box to strike against when the cam releases it to the contractive action of the springs, and a shaft 46 and pulley 47 for supporting said cam, and a rotating power for rotating said pulley.

This vibratory mechanism can be set on the ground, or it can be mounted in the tower under the first gold saving box. I do not illustrate it in the tower in Figure 7, as I seldom use it, but it is illustrated in Fig. 10.

My amalgamating member will be a valuable addition to my sluice box or flume line of boxes, as a primary factor is saving gold in connection with stamp mills, or other gold-ore crushing and grinding mills. I do not, however, need to use an amalgamating plate for general placer ground use, but its use may be desired by some placer workers in addition to the matting, screens or fibrous material or Brussels carpet 25A, or other woven fabrics.

There are also some characters of placer ground that contain fine and flour gold, and the flour gold especially is moved very easily along with the mixed water and placer gravel and sand as it flows through the box of my gold saving and concentrating device, which adds materially to the recovery of the fine and flour gold.

Cross riffles 48, are placed at intervals along the top of the surface of the screen 10, and secured down against it, and also to the inside surfaces of the opposite sides of my gold saving box. My invention contemplates in this respect, the use of any kind or character of gold and other metal stopping, retarding, hesitating riffle, that can be placed across my gold saving box, and secured there down against the top screen, within the box in the path of the flowing mixed placer gravel and sand and water, and that will act to cause the forwardly flowing gold or other metals to stop when they strike against it, and then settle down by gravity along its side surface through the spaces in the screen and into the fibrous or other character of a gold catching element or elements I may use in my gold saving and concentrating device.

I preferably use, however, wooden riffles 48, and I preferably secure them to the inside surfaces of the opposite sides of the box by nails 12, although any other means of securing them may be used if desired; and if desired, the edges 50 against which the flowing placer pulp strikes, may be beveled inwardly and also the rear top ends of the riffles may be also beveled downwardly towards the screen as illustrated in Fig. 1.

My invention is adapted to all kinds and characters of placer mining work, and for the recovery of gold that is now lost in the tailings of ore treating mills of all kinds, and platinum, gold, silver and other metals are satisfactorily separated from their gangue matter and are caught, held and recovered for commercial use; as once they move down into the gold and other metals catching and holding materials within my multiple sluice box flume, they cannot get away, as there is not and there cannot be an under current of water below them and along the bottom of the sluice box or between them to carry the very fine and float gold out of them and out of the sluice boxes, and while I have illustrated and described the preferred construction and arrangement of my apparatus, I do not wish to be limited to the automatically operating features shown, as changes may be made in them without departing from the spirit of my invention.

The operation of my device is as follows: A supply of gold, silver or other valuable metal bearing placer gravel and sand and a supply of running water, are discharged into the box, the larger rocks having previously been eliminated from the gravel. This mixture enters the upper end 5 of the box, which is adjusted at the angle desired by any suitable means. The mixture of water and gravel then flows by gravity in a stream that is thin enough to allow the particles of gold and other metals to engage and contact with the cross-wires 39, of the mesh of the screen 10, all of which act as cross-riffles to stop or retard the flow long enough for the precious metal to settle down through the open mesh to the matting. The metals are thus guided beneath the cross wire riffle screen and then settle in the wide interstices of the matting or screen or other material below the upper wire screen, where they are concentrated and they are removed therefrom when well filled with gold and other metal values.

Having described my invention what I claim as new and desire to secure by Letters Patent, is:—

1. An ore concentrating apparatus, comprising a flume box adapted to receive placer gravel and water, said box having a slanting bottom, and means for concentrating the ore particles to the bottom of said box, said means including a metal screen having short upright walls defining diamond shaped openings therebetween, said screen being so secured to said box that the short upright walls are inclined toward the in-flowing gravel and water.

2. The structure as set forth in claim 1, wherein a wire mesh screen having substantially rectangular openings is secured above said screen having diamond shaped openings.

3. The structure as set forth in claim 1, wherein a matting of relatively thick and coarse fabric defining relatively large interstices is secured between the bottom of said box and said screen having diamond shaped openings.

4. The structure as set forth in claim 1, wherein a plurality of mattings of relatively thick and coarse fabrics are secured in alternate layers with a plurality of the said screens having diamond shaped openings, one of said mattings being arranged against the bottom of said box.

5. The combination in a gold and other metal catching and concentrating apparatus, of a flume member, means for supplying said flume member with placer gravel, and with water enough to flow the placer gravel through said flume; gold catching and holding and concentrating twisted rope strand burlap in the bottom of said flume with a corrugated screen resting on top of said twisted rope strand burlap; and cross wire screen resting on top of said corrugated screen; riffles extending transversely across said cross wire screen and inside of said flume; and strips removably secured to the opposite inside surfaces of said flume and arranged to clamp said twisted rope strand burlap and said corrugated type of screen and said cross wire screen and its transverse riffles down tight enough against the inside bottom of said flume to prevent the flowing water from moving along the floor of said flume underneath said twisted rope strand burlap, whereby any flour gold that works through the twisted rope strand burlap onto the floor of said flume is prevented from being washed out of said flume.

In testimony whereof I affix my signature.

FOREST D. GOODY.